Patented Aug. 12, 1947

2,425,597

UNITED STATES PATENT OFFICE 2,425,597

METHOD OF SULPHURATION

John W. Church, Mount Lebanon, Pa., assignor to Falk & Company, Carnegie, Pa., a corporation of Pennsylvania No Drawing. Application April 14, 1942, Serial No. 438,905

2 Claims. (Cl. 106—223)

This invention relates to a method of sulphuration and particularly to a method of sulphurating, or vulcanizing by means of sulphur, organic compounds, such as unsaturated thermoplastic resins and fatty acid triglycerides.

When heated with an adequate proportion of sulphur to a reaction temperature within the approximate range of 330° F. to 410° F. unsaturated resins and unsaturated fatty acid triglycerides are susceptible to marked changes by the action of the sulphur. The first effect is one of saturation and during this stage of the sulphuration process the reaction takes place quietly without any profuse evolution of hydrogen sulphide, or marked darkening of the starting material. In other subsequent stages of the reaction, as heating of the reaction mass in the presence of the sulphur is continued, there is a strong evolution of hydrogen sulphide and a marked darkening of the reaction mass. It has been my experience that in the sulphuration of resins and fatty acid triglycerides to secure sulphurated products of various characteristics it is usually desirable to carry the reaction beyond its initial and quiet stage into higher stages in which marked darkening of the reaction mass is usually produced as the reaction proceeds. This is because it is in these later stages that saturation of the initially unsaturated fatty acid triglycerides and resins is completed and substitution and intermolecular linkages in the materials acted upon take place.

It is the object of my invention to provide simple procedure which results in eliminating or greatly decreasing the darkening effect of the sulphuration reaction when carried beyond the stage of simple saturation on unsaturated fatty acid triglycerides and unsaturated resins forming the reaction mass.

It is my discovery applicable to all sulphuration processes in which fatty acid triglycerides, resins, or reaction mixtures composed of both fatty acid triglycerides and resins, are subjected to sulphuration, that darkening of the reaction mass may be eliminated or greatly decreased by using a solution of sulphur rather than sulphur in ground or otherwise finely divided solid state. By employing sulphur in solution and conducting a sulphuration process within the normal range of vulcanization temperatures from 330° F. to 410° F. I have found that the reaction may be continued to any desired stage without appreciably darkening the product.

As exemplary of my invention, and it is to be understood that the same principles apply to the sulphuration of any vulcanizable thermoplastic oil soluble resins and any unsaturated fatty acid triglycerides, I dissolved 10 parts by weight of sulphur in 100 parts by weight of alpha-pinene with heating to about 320° F. I then slowly added to the sulphur solution with agitation 125 parts by weight of crushed 6% limed rosin and 75 parts by weight of kettle-bodied soya bean oil, and raised the temperature to about 350° F.

Within about 15 minutes while holding the reaction mass at that temperature the reaction had proceeded to a stage in which there was a substantial evolution of hydrogen sulphide gas and a marked thickening of the reaction mass. Upon continuing the reaction until the evolution of gas had perceptibly slowed, and then cooling, a high viscosity reaction product was obtained. Upon color comparison with the product obtained by fusing together similar limed rosin and kettle-bodied soya bean oil in the same proportions, it was found that the reaction product was not substantially darker than the starting material, both being of about a color 12 on the Gardner-Holdt color scale. A check procedure conducted similarly with limed rosin and kettle-bodied soya bean oil in the same prooprtions and in which sulphur in the same proportion was used, but in which the reaction mass was first heated to a temperature of 350° F. and the sulphur was added in finely divided solid state, showed a darkening to about a color 18 on the Gardner-Holdt color scale.

The same procedure is effective when using as a source of unsaturated fatty acid triglycerides any of the so-called drying and semi-drying oils, either in raw condition or as pretreated by kettle-bodying, and when using any of the thermoplastic vulcanizable resins, such as rosin, coumarone-indene resin, petroleum resin, terpene resin, either raw or in a pretreated condition such as limed or esterified rosin (ester gum), or by hydrogenated or chlorinated rosin, coumarone-indene resin, petroleum resin, or terpene resin.

Any of the less evaporative solvents for the sulphur may be used, but I have found it preferable to use one of the cyclic hydrocarbon solvents; such as the aromatics as exemplified by toluol and benzol, or carbo-cyclic terpene hydrocarbons, such as whole turpentines, or their fractions as exemplified by alpha-pinene, dipentene, terpinene and the like.

Further to exemplify my invention, I slowly added 100 parts by weight of ground raw rosin to 8 parts by weight of sulphur dissolved in 100 parts by weight of benzol, and raised the temperature of the batch gradually to about 350° F.

Heating was continued to a stage in which hydrogen sulphide was evolved and the batch thickened. Although the rosin was slightly darkened by the sulphuration treatment, the darkening was much less than is caused by the addition of ground sulphur to the starting material.

The above procedure was duplicated on coumarone-indene resin, diolefin (petroleum) resin and terpene resin, with approximately identical advantage in the prevention of darkening in the material subjected to vulcanization.

Also, I slowly added 100 parts by weight of kettle-bodied linseed oil to a solution of 6 parts by weight of sulphur dissolved in 50 parts by weight of dipentene, and raised the temperature of the batch gradually to about 350° F. The batch was held at that approximate temperature to a stage in which hydrogen sulphide was evolved and the batch thickened. The vulcanized material was almost imperceptibly darker than before vulcanization.

The process of my invention may be stated as the addition of a starting material selected from the unsaturated fatty acid triglycerides, isolated if so desired but usually as they occur in the drying and semi-drying oils, and unsaturated oil soluble thermoplastic resins, to a vulcanizing agent consisting of sulphur in solution; the starting material consisting of either of the above materials taken alone or as mixed with each other.

I have discovered that if the process is conducted at atmospheric pressures, the feature of dissolving the sulphur in a solvent boiling below the temperature of the vulcanization reaction is none-the-less effective. This is because the sulphur solution, if given a chance to mix well with the starting material, either by slow addition of the latter or by agitation, so permeates the reaction mass and is dissolved therein or occluded thereby that intense localized reaction is avoided in spite of the volatile nature of the solvent. Desirably the solvent is preserved for reuse as by hooding the reaction vessel, or by refluxing the solvent.

In my companion application Serial No. 438,902, filed of even date herewith, I have disclosed a method of vulcanization in which darkening of the reaction mass is inhibited by the inclusion of a mineral oil as a substantial proportion thereof, and under such conditions sulphuration under the influence of sulphur added to the reaction mixture as a finely divided solid is contemplated. The procedure herein disclosed, in which the sulphur is used in the form of a solution, and in which the ingredients of the reaction mixture are added to the sulphur and the reaction mass is then heated to a temperature at which the reaction takes place, may be employed in reaction mixtures from which mineral oil is omitted, as well as those in which it is included, effectively to inhibit darkening in the reaction mass.

It is to be understood generally that the terms and exemplifications herein used are descriptive and illustrative rather than restrictive, and that numerous changes may be made in the compositions embodying my invention, and in the procedure by which they are made while remaining within the bounds of my invention as defined in the appended claims.

I claim as my invention:

1. The herein described method of producing light colored sulphurized products from starting materials selected from the group consisting of the unsaturated fatty acid triglycerides, the unsaturated oil soluble thermoplastic resins, and mixtures of them, by agitating a starting material so composed in a prepared reaction bath composed of elemental sulphur dissolved in a liquid organic solvent therefor while keeping the batch composed of the said reaction bath and starting material within the approximate temperature range of 330° F. to 410° F., and carrying vulcanization of the starting material to a stage in which the batch thickens and hydrogen sulphide is evolved.

2. The herein described method of producing light colored sulphurized products from starting materials selected from the group consisting of the unsaturated fatty acid triglycerides, the unsaturated oil soluble thermoplastic resins, and mixtures of them, by agitating a starting material so composed in a prepared reaction bath composed of elemental sulphur dissolved in a cyclic hydrocarbon solvent while keeping the batch composed of the said reaction bath and starting material within the approximate temperature range of 330° F. to 410° F., and carrying vulcanization of the starting material to a stage in which the batch thickens and hydrogen sulphide is evolved.

JOHN W. CHURCH.

REFERENCES CITED

The following references are of record in the file of this patent:

UNITED STATES PATENTS

| Number | Name | Date |
|---|---|---|
| 1,590,800 | Becker | June 29, 1926 |
| 2,111,882 | Borglin | Mar. 22, 1938 |
| 2,186,646 | Lincoln et al. | Jan. 9, 1940 |
| 2,220,843 | Johnson | Nov. 5, 1940 |
| 2,262,523 | Bacon et al. | Nov. 11, 1931 |
| Re. 6,708 | Day | Oct. 19, 1875 |

FOREIGN PATENTS

| Number | Country | Date |
|---|---|---|
| 629,213 | France | Nov. 7, 1927 |
| 15,595 | Great Britain | 1914 |